United States Patent Office 3,037,793
Patented June 5, 1962

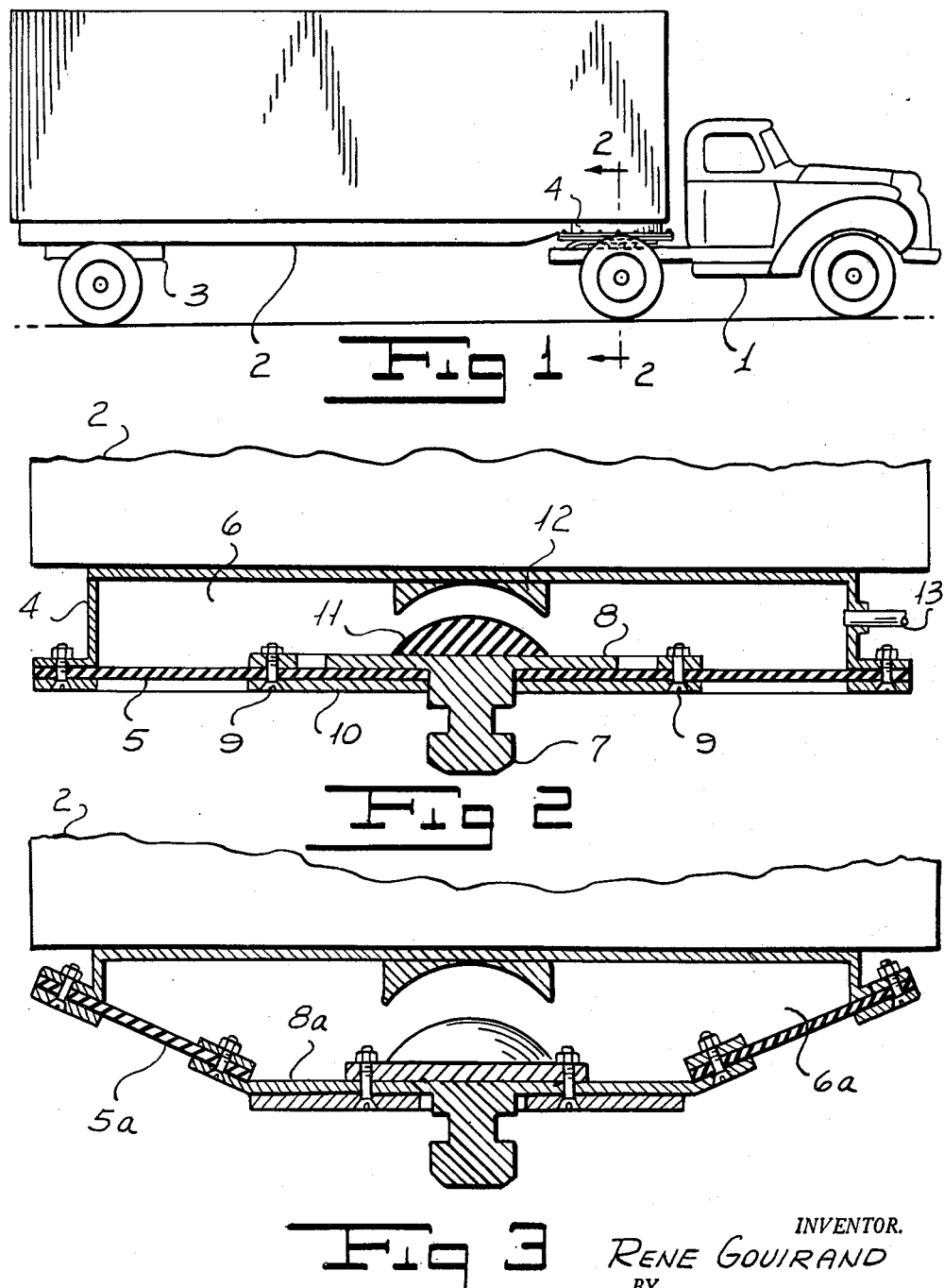

3,037,793
PNEUMATIC SUSPENSION FOR TRAILER
FIFTH WHEELS
Rene Gouirand, 210 W. 88th St., New York, N.Y.
Filed Aug. 26, 1960, Ser. No. 52,082
1 Claim. (Cl. 280—440)

This invention is a pneumatic suspension for trailers of the character wherein the forward end of the trailer is supported on the fifth wheel of a tractor when the tractor and trailer are in assembled relation.

Conventional tractors are provided with so-called fifth wheel construction which comprises essentially an opening or socket in which is received the king pins of the trailers. The king pin is ordinarily rigidly mounted on the under side of the forward end of the trailer and any cupshioning which that end of the trailer receives during its passage along the highway is dependent solely upon springs interposed between the rear axle of the tractor and the frame of the tractor on which the fifth wheel is supported.

As time passes, appreciation of pneumatic suspension is becoming more apparent and many trailers are provided with such suspensions at their rear ends. By such a construction the rear portion of the trailer is effectively cushioned to protect fragile cargoes from damage when passing over rough roads while the forward end of the trailer is not protected against sudden shocks and jars which cannot be prmoperly cushioned with the relatively heavy steel springs with which a great majority of tractors are equipped. As a result fragile articles in the forward portion of the trailer may be damaged by inadequately cushioned shocks, while those articles in the rear portion of the trailer ride without damage.

The object of the present invention is to provide a trailer wherein the advantages of pneumatic suspension are provided at both rear and forward portions of the trailer even though that trailer is associated with the usual tractor having steel spring suspension.

In practically carrying out this invention, I mount a pneumatic suspension directly on the under side of the forward end of the trailer, so that a pneumatic chamber is interposed between the body of the trailer and the king pin of such trailer, so that when such a trailer is coupled to a tractor with the usual steel spring suspension, the forward portion of the trailer will ride as smoothly as its rear end portion and thus all merchandise carried in the trailer will be properly safeguarded against breakage or other damage.

Features of the invention, other than those adverted to, will be apparent from the detailed description and appended claim, when read in conjunction with the accompanying drawing.

The accompanying drawing illustrates different practical embodiments of the invention, but the constructions therein shown are to be understood as illustrative, only, and not as defining the limits of the invention.

FIG. 1 shows a tractor trailer combination in side elevation, the trailer being equipped with the present invention.

FIG. 2 is a transverse section through the pneumatic suspension of the trailer, said section being taken on the line 2—2 of FIG. 1.

FIG. 3 is a like section showing a modified form of pneumatic suspension.

In the accompanying drawings, 1 designates a tractor and 2 a trailer. The tractor is of conventional form with the ususal spring suspension and it is provided at the rear of its chassis frame with a conventional fifth wheel plate to receive the king pin of a tractor. All parts of the tractor shown in these drawings are conventional.

The trailer 2 is provided at its rear end with any suitable pneumatic suspension indicated generally by the reference character 3, while the forward end of such trailer is provided with the pneumatic suspension of this invention.

As shown in FIG. 2, this suspension comprises a pneumatic chamber casing 4 rigidly secured to the under side of the trailer and forming a permanent part thereof. Across the bottom of this casing is a flexible diaphragm 5 which is peripherally secured to the casing to form therewith a hermetic seal, so as to provide within the casing 4 a pneumatic chamber 6.

Attached to the diaphragm 5, in any suitable manner, is the king pin 7. As here shown it is provided at its upper end with a plate 8 attached to the diaphragm by bolts 9 which pass through the diaphragm and a lower plate 10 to firmly attach the king pin to the diaphragm in a manner to preclude pressure leakage about the king pin. I may mount upont the plate 8 a rubber cushion 11 adapted to act against a stop 12 in the event of excess shock, although this shock absorbing arrangement is not essential to this invention.

All parts of the diaphragm shown in FIG. 2 normally occupy the same plane so that the diagphragm is a flat diaphragm. In FIG. 3, however, the diaphragm 5a is in the form of a hollow conical section, the inner periphery of which is bolted to the outer periphery of the plate 8a, which corresponds to the plate 8 of FIG. 2. The structure is otherwise the same as in FIG. 2.

Air under the desired pressure may be admitted into or drawn from the chamber 6 through a pipe 13, as shown in FIG. 2, and a similar arrangement is provided in FIG. 3, so that pressure within pneumatic chamber 6 of FIG. 2 or the pneumatic chamber 6a of FIG. 3 may be adjusted in accordance with the loading of the trailer.

The king pin employed on the suspension of these two figures is of conventional size and shape, so that it may properly cooperate with the fifth wheel of any conventional steel spring suspended tractor. Also, if it should so happen that the particular tractor chosen to haul a trailer embodying the present invention should be provided with pneumatic suspension, it would nevertheless have the conventional fifth wheel with which the king pin of the trailer of this invention could properly cooperate. The only difference would be that in the latter case there would be, in effect, a double pneumatic suspension for the forward end of the trailer.

From my experience witht pneumatic suspensions, I know that diaphragms associated with the suspension of this invention will adequately withstand draft, braking and all other strains to which a trailer embodying this invention may be subjected.

The foregoing detailed description sets forth the invention in its preferred practical forms, but the invention is to be understood as fully commensurate with the appended claim.

Having thus fully described the invention, what I claim as new and desire to secure by Letters Patent is:

A tractor provided at its rear end with a fifth wheel plate assembly, and a trailer provided at its forward end with a rigid pneumatic chamber casing having an open bottom across which a flexible diaphragm is hermetically sealed, and a bearing plate secured to the diaphragm to rest upon the fifth wheel plate assembly of the tractor to support the weight of the forward end of the trailer on said assembly, and a king pin carried by said bearing plate and engaging with said fifth wheel plate assembly of the tractor.

References Cited in the file of this patent

UNITED STATES PATENTS

| | | |
|---|---|---|
| 770,847 | Downer | Sept. 27, 1904 |
| 2,624,594 | Gouirand | Jan. 6, 1953 |
| 2,747,862 | Gouirand | May 29, 1956 |
| 2,819,094 | Gouirand | Jan. 7, 1958 |
| 2,821,409 | Chalmers | Jan. 28, 1958 |
| 2,838,321 | Gouirand | June 10, 1958 |
| 2,920,905 | Cekada et al. | Jan. 12, 1960 |
| 2,947,547 | Gouirand | Aug. 2, 1960 |